UNITED STATES PATENT OFFICE.

CYPRIEN M. TESSIÉ DU MOTAY, OF PARIS, FRANCE, AND LEONARD F. BECKWITH, OF NEW YORK, N. Y.

IMPROVEMENT IN THE PRODUCTION OF COLD IN ICE-MACHINES.

Specification forming part of Letters Patent No. 221,753, dated November 18, 1879; application filed April 19, 1879.

*To all whom it may concern:*

Be it known that we, CYPRIEN M. TESSIÉ DU MOTAY, of Paris, in the Republic of France, and LEONARD F. BECKWITH, of New York, in the county and State of New York, have invented a new and useful Agent for the Production of Cold and Application of the Same to Refrigerating Apparatus and Ice-Machines, which improvement is fully set forth in the following specification.

For the production of cold in refrigerating apparatus or ice-machines, the chlorhydric ether from methylic alcohol is especially adapted, being, of all the ethers known at the present time, the most suitable; but, like all ethers, it is, on account of its easy inflammability, dangerous in use. We have therefore sought, by uniting this ether with substances in a gaseous state possessing the quality of extinguishing fire and capable of being reduced to a liquid condition by pressure and cold combined, at approximately the same pressure and degree of cold as the chloride of methyl itself, to form a combination free from inflammable properties and capable of producing an intense cold at low cost. In following out this principle we have been led to the formation of a binary substance which we designate "chloro-methylic sulphurous gas"—a substance free from inflammable properties, and combining the refrigerating qualities of both the chloride of methyl and the anhydrous sulphurous acid, viz., that it is able, in all climates and in all atmospheric temperatures, to produce the maximum quantity of ice or cold air with the minimum of motive power in all refrigerating apparatus working by expansion.

This invention consists, therefore, in a new compound, its manufacture and application to refrigerating apparatus working expansively, as hereinafter more fully set forth.

The following description will enable those skilled in the art to which it appertains to make and use our said invention.

For the manufacture of the chloro-methylic sulphurous gas, the methylic chloride in a gaseous state is first mixed with the anhydrous sulphurous acid, also in a gaseous condition, in such proportions that the sulphurous-acid gas serves as an extinguisher to the methylic-chloride gas, and this mixture is effected in receivers or gasometers arranged for the purpose.

The mixture thus obtained is withdrawn by compression and suction pumps, and compressed in reservoirs surrounded by a freezing-mixture to the point of liquefaction of both sulphurous-acid gas and methylic-chloride gas.

The method and means for the production of methylic-chloride, and also of anhydrous sulphurous acid, are known, and need not be here described, and for the purposes of this invention the said gases may be made or obtained in any ordinary or suitable way.

The proportions in which the two gases are mixed may be varied somewhat, those preferably employed being about one volume of methylic chloride to one volume of anhydrous sulphurous acid, (more or less, according to climate,) measured at the same temperatures and pressures.

The inflammability of the ether may be reduced without destroying it altogether by using a smaller proportion of anhydrous sulphurous gas, and in some cases it may be desirable to increase the quantity.

No special apparatus is required to carry out the invention. Any apparatus of the general character specified might be employed.

In the gasometers or receivers a fan might be employed, if desired, to aid the diffusion and mixture of the gases.

The liquid obtained is suitable for use in any of the apparatus for refrigerating or cooling buildings or vessels, or in any ice-machines working expansively, now in use. It is needless to add that this binary liquid thus constituted, when hermetically inclosed in cylinders or metallic receivers capable of withstanding the required pressures, may be transported without danger of fire, and sold in this condition to producers of ice or cold air.

No special description is necessary of the manner of applying the new agent in the apparatus in which it is to be employed, as it may be introduced into and continued in the circulation thereof in the same manner as ammonia and other liquefiable gases have been heretofore treated.

A part of the benefit of our invention may be obtained by uniting or mixing with inflammable refrigerating agents other than methyl chloride a fire-extinguishing gas liquefiable under approximately the same conditions of temperature and pressure.

Having thus fully described our said invention, what we claim, and desire to secure by Letters Patent, is as follows:

1. A liquefiable gas or refrigerating agent for use in machines for the production of cold, composed of an inflammable and a fire-extinguishing gas, liquefiable at approximately the same temperature and pressure, substantially as described.

2. The herein-described chloro-methylic sulphurous gas, consisting of methyl chloride and anhydrous sulphurous acid, as set forth.

3. The method of rendering inflammable gases suitable for use in refrigerating apparatus or ice-machines, the same consisting in mixing or uniting with a gas of that character a fire-extinguishing gas liquefiable under approximately the same conditions of temperature and pressure, substantially as described.

4. As an article of manufacture and sale, liquefied chloro-methyl sulphurous gas, substantially as described.

In testimony whereof we have signed this specification in the presence of two subscribing witnesses.

C. M. TESSIÉ DU MOTAY.
LEONARD F. BECKWITH.

Witnesses:
A. POLLOK,
GEORGE WOFFENDEN.